US010030891B2

(12) United States Patent
Chang

(10) Patent No.: US 10,030,891 B2
(45) Date of Patent: Jul. 24, 2018

(54) PANELS FORMED FROM ETHYLENE-BASED POLYMER COMPOSITIONS

(71) Applicant: DOW GLOBAL TECHNOLOGIES LLC, Midland, MI (US)

(72) Inventor: Dane Chang, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 656 days.

(21) Appl. No.: 14/405,335

(22) PCT Filed: Jun. 25, 2013

(86) PCT No.: PCT/US2013/047631
§ 371 (c)(1),
(2) Date: Dec. 3, 2014

(87) PCT Pub. No.: WO2014/004517
PCT Pub. Date: Jan. 3, 2014

(65) Prior Publication Data
US 2015/0159916 A1 Jun. 11, 2015

Related U.S. Application Data

(60) Provisional application No. 61/663,643, filed on Jun. 25, 2012.

(51) Int. Cl.
*F16L 11/08* (2006.01)
*F28F 1/00* (2006.01)
(Continued)

(52) U.S. Cl.
CPC .............. *F24J 2/243* (2013.01); *C08K 5/0008* (2013.01); *C08K 5/01* (2013.01); *C08K 5/101* (2013.01);
(Continued)

(58) Field of Classification Search
CPC ........ F16L 11/085; F28F 21/062; F28F 1/003; Y10S 165/905
(Continued)

(56) References Cited

U.S. PATENT DOCUMENTS 4,779,673 A * 10/1988 Chiles ................... F16L 11/085
126/620
7,744,972 B2 6/2010 Ho et al.
(Continued)

FOREIGN PATENT DOCUMENTS

JP 2007031699 A 2/2007

OTHER PUBLICATIONS

International Search Report and Written Opinion of the International Searching Authority for PCT/US2013/047631, dated Aug. 1, 2013, pp. 1-8.
(Continued)

*Primary Examiner* — Ellen S Wood

(57) ABSTRACT

The invention provides a panel comprising at least the following components: a) at least one hollow container; b) an inlet; c) an outlet; and wherein the inlet is connected to the end of the at least one hollow container; and the outlet is connected to an opposite end of the at least one hollow container; and wherein the at least one hollow container comprises at least one component formed from a composition comprising the following components: A) an ethylene-based polymer; B) a compound selected from Formula 1, as described herein; and C) a compound selected from Formula 2, as described herein; and wherein the weight ratio of Component C to Component B (C/B) is greater than, or equal to, 1.

16 Claims, 5 Drawing Sheets

Top View

Tubing End View

(51) Int. Cl.
| | |
|---|---|
| *F28F 21/06* | (2006.01) |
| *F24J 2/24* | (2006.01) |
| *C08K 5/00* | (2006.01) |
| *C08K 5/01* | (2006.01) |
| *C08K 5/101* | (2006.01) |
| *C08K 5/13* | (2006.01) |
| *C08K 5/134* | (2006.01) |
| *C08K 5/18* | (2006.01) |
| *F24J 2/20* | (2006.01) |

(52) U.S. Cl.
CPC .............. *C08K 5/13* (2013.01); *C08K 5/1345* (2013.01); *C08K 5/18* (2013.01); *F24J 2/201* (2013.01); *F24J 2/242* (2013.01); *F24J 2/246* (2013.01); *Y02E 10/44* (2013.01)

(58) Field of Classification Search
USPC .................................. 428/34.1; 165/45, 905
See application file for complete search history.

(56) References Cited

U.S. PATENT DOCUMENTS

| | | |
|---|---|---|
| 8,163,226 B2 | 4/2012 | Ho et al. |
| 2007/0092675 A1 | 4/2007 | Ho et al. |
| 2014/0004287 A1 | 1/2014 | Baker et al. |

OTHER PUBLICATIONS

International Preliminary Report on Patentability for PCT/US2013/047631, dated Dec. 31, 2014, pp. 1-5.

* cited by examiner

Top View

Tubing End View

PANELS FORMED FROM ETHYLENE-BASED POLYMER COMPOSITIONS

REFERENCE TO RELATED APPLICATIONS

This application claims the benefit of U.S. Provisional Application No. 61/663,643, filed on Jun. 25, 2012.

Polymeric solar collector, used for swimming pool heating and household water heating, now account for a large number of solar applications in the world. Thermoplastic is typically chosen, rather than thermoset polymers, due to ease of processing. Polypropylene is typically used for solar panel applications due to its combination of high tensile strength, creep resistance, stress crack resistance, fatigue resistance, total corrosion resistance, processability and price performance ratio. However, one of the problems with polypropylene is its susceptibility to degradation (e.g., photo, UV). Although, with the use of the right type of carbon black, it may be possible to screen the UV, and turn it to heat, before causing polymer chain scission and free radical formation, which will weaken the polymer, hastening its failure. However, carbon black is typically a prodegradant for polypropylene. Another problem for polypropylene is its poor resistance to chlorinated water. Typically, about 1 wt % (e.g., 10,000 ppm) or more of antioxidant additive package is added to polypropylene to improve its resistance to chlorine. The low temperature ductility or impact resistance of polypropylene is also problematic, since many solar water heating systems are used in the dessert area, where significant temperature gradients exist over the course of a 24 hour day, with the rising and setting of the sun. Thus, there is a need for new solar panels prepared from polymer compositions that have improved UV resistance, improved low temperature impact resistance, and improved weatherablity. These needs and others have been met by the following invention.

SUMMARY OF THE INVENTION

The invention provides a panel comprising at least the following components:
a) at least one hollow container;
b) an inlet;
c) an outlet; and
wherein the inlet is connected to the end of the at least one hollow container; and the outlet is connected to an opposite end of the at least one hollow container;
and wherein the at least one hollow container comprises at least one component formed from a composition comprising the following components:
A) An Ethylene-based Polymer;
B) A Compound Selected From Formula 1:

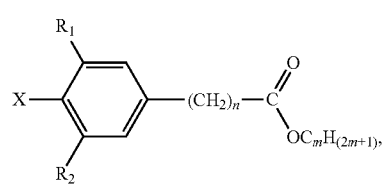

(Formula 1)

wherein R1 and R2 are each independently selected from a C1-C20 alkyl group,

X is selected from Cl, Br, I, F, OH, $NH_2$, NHR' or NR'R", where R' and R" are each independently a C1-C6 alkyl,
n is from 1 to 10, and
m is from 10 to 30,
and wherein this compound is present in an amount greater than, or equal to, 500 ppm, based on the total weight of the composition;
C) A Compound Selected From Formula 2:

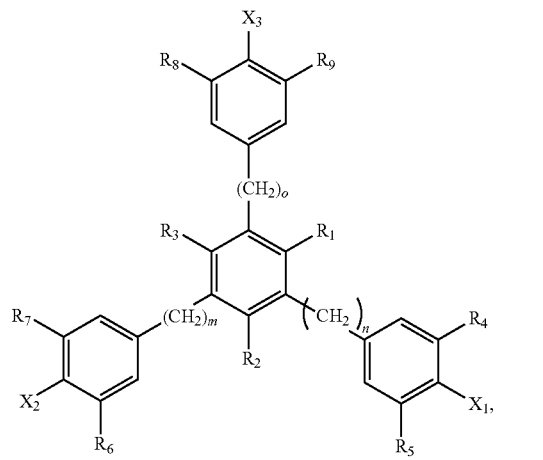

(Formula 2)

wherein R1, R2 and R3 are each independently selected from a C1-C20 alkyl group;
R4, R5, R6, R7, R8 and R9 are each independently selected from a C1-C20 alkyl group,
X1, X2 and X3 are each independently selected from Cl, Br, I, F, OH, $NH_2$, NHR' or NR'R", where R' and R" are each independently a C1-C6 alkyl,
n is from 1 to 6,
m is from 1 to 6, and
o is from 1 to 6;
and wherein the weight ratio of Component C to Component B (C/B) is greater than, or equal to, 1.

DETAILED DESCRIPTION

Figure 1A:
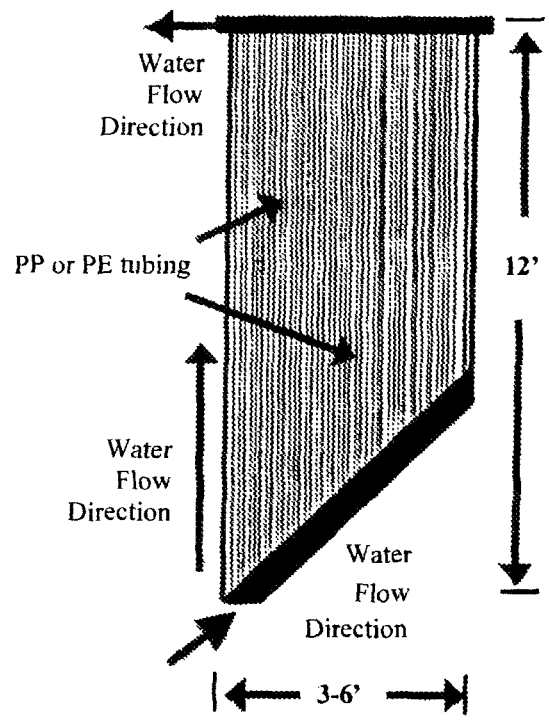
FIG. 1A is schematic of a top view of a multiple tube angular panel.
Figure 1B:
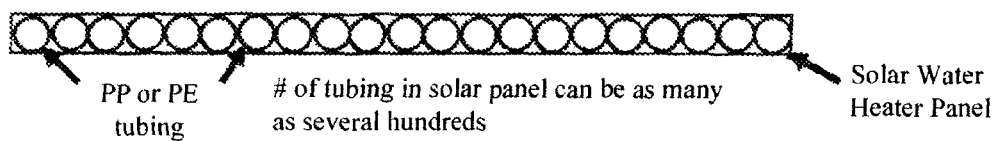
FIG. 1B is schematic of a cross section view of a multiple tube angular panel.

As discussed above, the invention provides panel comprising at least the following components:

a) at least one hollow container;
b) an inlet;
c) an outlet; and wherein the inlet is connected to the end of the at least one hollow container; and the outlet is connected to an opposite end of the at least one hollow container;
and wherein the at least one hollow container comprises at least one component formed from a composition comprising the following components:
A) An Ethylene-based Polymer;
B) A Compound Selected From Formula 1:

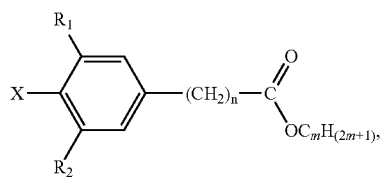

(Formula 1)

wherein R1 and R2 are each independently selected from a C1-C20 alkyl group,
X is selected from Cl, Br, I, F, OH, $NH_2$, NHR' or NR'R", where R' and R" are each independently a C1-C6 alkyl,
n is from 1 to 10, and
m is from 10 to 30,
and wherein this compound is present in an amount greater than, or equal to, 500 ppm, based on the total weight of the composition;
C) A Compound Selected From Formula 2:

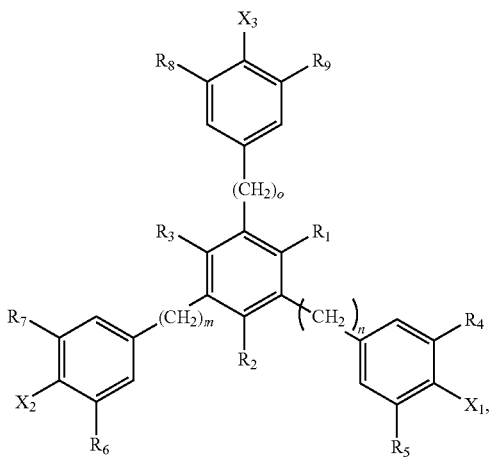

(Formula 2)

wherein R1, R2 and R3 are each independently selected from a C1-C20 alkyl group;
R4, R5, R6, R7, R8 and R9 are each independently selected from a C1-C20 alkyl group,
X1, X2 and X3 are each independently selected from Cl, Br, I, F, OH, $NH_2$, NHR' or NR'R", where R' and R" are each independently a C1-C6 alkyl,
n is from 1 to 6,
m is from 1 to 6, and
o is from 1 to 6;
and wherein the weight ratio of Component C to Component B (C/B) is greater than, or equal to, 1.

An inventive panel may comprise a combination of two or more embodiments described herein.

In one embodiment, the at least one hollow container has a wall thickness less than, or equal to, 1 mm, further less than, or equal to, 0.7 mm, and further less than, or equal to, 0.5 mm. In a further embodiment, the at least one hollow container is a tube.

In one embodiment, the at least one hollow container has a wall thickness greater than, or equal to, 0.050 mm, further greater than, or equal to, 0.075 mm. In a further embodiment, the at least one hollow container is a tube.

In one embodiment, the at least one hollow container has an inner diameter greater than, or equal to, 0.25 inch, further greater than, or equal to, 0.50 inch. In a further embodiment, the at least one hollow container is a tube.

In one embodiment, the at least one hollow container has a total surface area greater than, or equal to, 12 square feet. In a further embodiment, the at least one hollow container is a tube.

In one embodiment, the at least one hollow container is in the form of a coiled tube.

In one embodiment, the at least one hollow container is connected to the inlet by heat fusion, insertion fitting, or a combination thereof. As used herein, the term "inlet" refers to a means (e.g., a device) where water, from an outside source, enters the panel. The inlet is a separate component from the at least one hollow container.

In one embodiment, the major axis of inlet is oriented perpendicular to the major axis of the at least one hollow container. In a further embodiment, both the inlet and the at least one hollow container are each, independently, in the form of a tube.

In one embodiment, the at least one hollow container is connected to the outlet by heat fusion, insertion fitting, or a combination thereof. As used herein, the term "outlet" refers to a means (e.g., a device) where water exits the panel. The outlet is a separate component from the at least one hollow container.

In one embodiment, the major axis of outlet is oriented perpendicular to the major axis of the at least one hollow container. In a further embodiment, both the outlet and the at least one hollow container are each, independently, in the form of a tube.

In one embodiment, the inlet is a cylindrical container. In a further embodiment, the inlet is a tube.

In one embodiment, the outlet is a cylindrical container. In a further embodiment, the outlet is a tube.

In one embodiment, the inlet is formed from the same composition as the composition used to form the outlet.

In one embodiment, the inlet is formed from the same composition as the composition used to form the at least one hollow container. In a further embodiment, the outlet is formed from the same composition as the composition used to form the inlet.

In one embodiment, the outlet is formed from the same composition as the composition used to form the at least one hollow container. In a further embodiment, the inlet is formed from the same composition as the composition used to form the outlet.

A hollow container may comprise a combination of two or more embodiments as described herein.

An inlet may comprise a combination of two or more embodiments as described herein.

An outlet may comprise a combination of two or more embodiments as described herein.

In one embodiment, the panel comprises at least two hollow containers, and further at least two tubes. In a further embodiment, the at least two hollow containers, and further at least two tubes, are arranged in parallel configuration.

In one embodiment, for the composition, the weight ratio of C/B is from 1 to 6.

In one embodiment, for the composition, the weight ratio of C/B is greater than 1.

In one embodiment, for the composition, Component B is present in an amount from 500 to 2500 ppm, based on the weight of the composition.

In one embodiment, for the composition, Component C is present in an amount from 1000 to 3000 ppm, based on the weight of the composition.

In one embodiment, the composition further comprises Component D, selected from Formula 3:

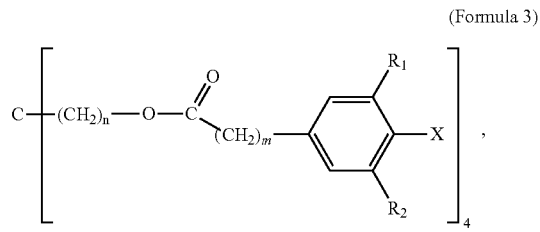

(Formula 3)

wherein R1 and R2 are each independently selected from a C1-C20 alkyl group,

X is selected from Cl, Br, I, F, OH, $NH_2$, NHR' or NR'R", where R' and R" are each independently a C1-C6 alkyl, n is from 1 to 10, and m is from 1 to 10.

In one embodiment, the "weight ratio of Component D to Component B" (D/B) is from 0.5 to 2.5, or from 1 to 2.0, or from 1.3 to 1.6.

In one embodiment, Component D is present in an amount from 500 to 2500 ppm, based on the weight of the composition.

In one embodiment, the composition further comprises Component E, selected from Formula 4:

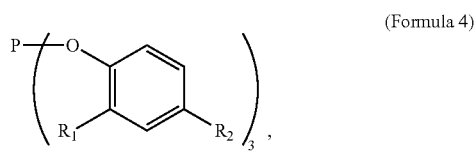

(Formula 4)

wherein R1 and R2 are each independently selected from a C1-C20 alkyl group.

In one embodiment, the "weight ratio of Component E to Component B" (E/B) is from 0.5 to 2, or from 0.8 to 1.5, or from 0.9 to 1.3.

In one embodiment, Component E is present in an amount from 500 to 1500 ppm, based on the weight of the composition.

In one embodiment, the composition further comprises Component F selected from Formula 5:

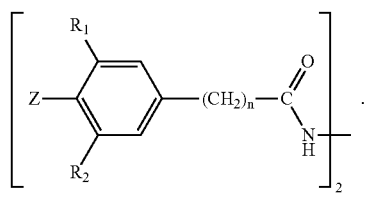

(Formula 5)

wherein R1 and R2 are each independently selected from a C1-C20 alkyl group;

Z is selected from Cl, Br, I, F, OH, $NH_2$, NHR' or NR'R", where R' and R" are each independently a C1-C6 alkyl; and n is from 1 to 10.

In one embodiment, the composition comprises greater than, or equal to 50 weight percent of the ethylene-based polymer, based on the weight of the composition. In a further embodiment, composition comprises greater than, or equal to 70 weight percent, and further greater than, or equal to 90 weight percent, of the ethylene-based polymer, based on the weight of the composition.

In one embodiment, the composition further comprises carbon black. Suitable carbon black includes, but is not limited to, N-110, N-220, N-330 and N-550 (available from Evonik, Cabot, Columbia).

A composition may comprise a combination of two or more embodiments as described herein.

In one embodiment, for the composition, the ethylene-based polymer has a density from 0.930 to 0.960 g/cc, and further from 0.940 to 0.960 g/cc (1 cc=1 $cm^3$).

In one embodiment, the ethylene-based polymer has a density from 0.940 to 0.955 g/cc, further from 0.945 to 0.955 g/cc (1 cc=1 $cm^3$).

In one embodiment, the ethylene-based polymer has a melt index (I2) from 0.01 to 5 g/10 min, further from 0.02 to 4 g/10 min, further from 0.05 to 2 g/10 min.

In one embodiment, the ethylene-based polymer has a high load melt index ($I_{21}$) from 1 to 15 g/10 min, or from 2 to 12 g/10 min, or from 3 to 10 g/10 min.

In one embodiment, the ethylene-based polymer has a molecular weight distribution from 10 to 30, or from 12 to 28, or from 15 to 25, as determined by conventional GPC.

In one embodiment, the ethylene-based polymer is a blend comprising at least two polymers. In a further embodiment, each ethylene-base polymer, independently, is an ethylene/α-olefin interpolymer, and preferably an ethylene/α-olefin copolymer. Suitable α-olefins include, for example, propylene, 1-butene, 1-hexene and 1-octene, and further 1-hexene and 1-octene.

In one embodiment, the ethylene-base polymer is an ethylene/α-olefin interpolymer, and preferably an ethylene/α-olefin copolymer. Suitable α-olefins include, for example, propylene, 1-butene, 1-hexene and 1-octene, and further 1-hexene and 1-octene. In a further embodiment, the ethylene-based polymer further comprises a polyethylene homopolymer.

In one embodiment, the ethylene-based polymer is a multimoldal polymer.

In one embodiment, the ethylene-based polymer is a bimoldal polymer.

In one embodiment, the ethylene-based polymer is a unimoldal polymer.

The ethylene-based polymer may comprise two or more embodiments as described herein.

Suitable ethylene-based polymers include, but are not limited to, DGDA-2399 PE-RT Resin, available from The Dow Chemical Company.

The composition may comprise two or more embodiments as described herein.

In one embodiment, the panel comprises at least one angular end. For example, see FIG. 1A.

Figure 2A:
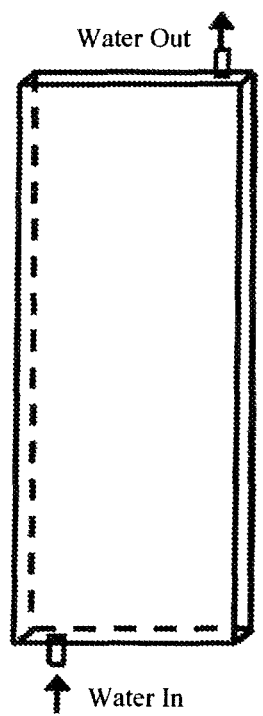
FIG. 2A is schematic of a top view of a rectangular tank panel.
Figure 2B:
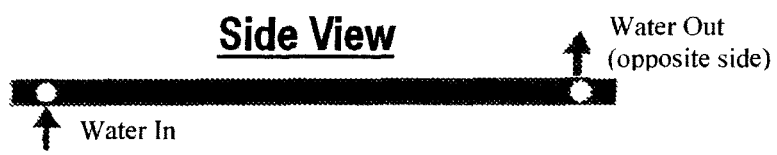
FIG. 2B is schematic of a cross section view of a rectangular tank panel.

In one embodiment the panel is a rectangular tank panel. For example, see FIG. 2A.

Figure 3A:
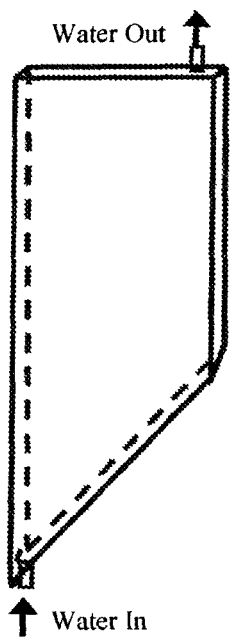
FIG. 3A is schematic of a top view of an angular tank panel.
Figure 3B:
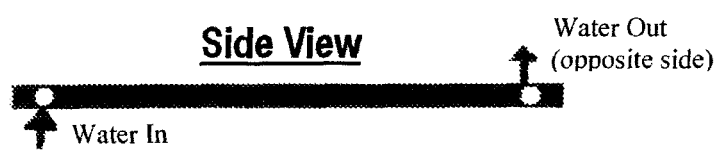
FIG. 3B is schematic of a cross section view of an angular tank panel.

In one embodiment, the panel is a tank panel comprising at least one angular end. For example, see FIG. 3A.

In one embodiment, the panel further comprises at least one hollow container, comprising at least one component formed from a composition comprising a propylene-based polymer.

Figure 4:
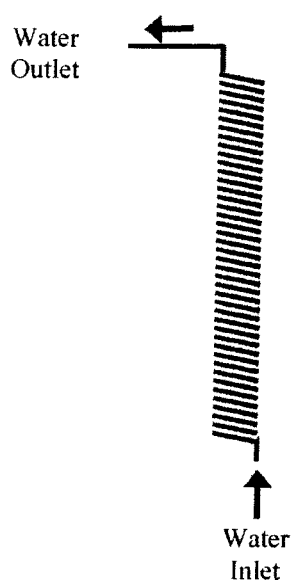
FIG. 4 is schematic of a top view of a panel containing a coiled tube.

In one embodiment, the panel comprises at least one coiled tube. For example, see FIG. 4.

In one embodiment, the panel is a solar panel.

An inventive panel may comprise a combination of two or more embodiments as described herein.

Antioxidants

Antioxidants include, but are not limited to, the following Formulas 1-5. Formula 1 is shown below:

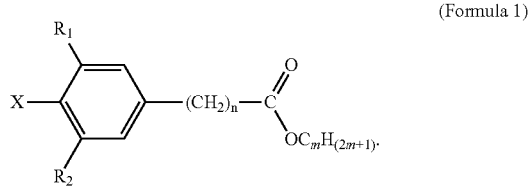

(Formula 1)

In Formula 1, R1 and R2 are each independently selected from a C1-C20 alkyl group;

X is selected from Cl, Br, I, F, OH, $NH_2$, NHR' or NR'R", where R' and R" are each independently a C1-C6 alkyl;

n is from 1 to 10; and m is from 10 to 30.

Examples of C1-C20 alkyls include, but are not limited to, methyl, ethyl, n-propyl, iso-propyl, n-butyl, sec-butyl, iso-butyl, tert-butyl, n-pentyl, neopentyl, n-hexyl, and cyclohexyl.

In one embodiment, in Formula 1, R1 and R2 are each independently a C1-C10 alkyl, a C1-C6 alkyl, a C1-C4 alkyl, a C2-C4 alkyl, or a C3-C4 alkyl. In a further embodiment, R1 and R2 are each independently a C4 alkyl.

In one embodiment, in Formula 1, R1 and R2 are each independently selected from n-butyl, sec-butyl, iso-butyl, tert-butyl. In a further embodiment, R1 and R2 are each tert-butyl.

In one embodiment, in Formula 1, R1 and R2 are the same alkyl substituent.

In one embodiment, in Formula 1, X is selected from Cl, Br or OH. In a further embodiment, X is selected from Cl or OH. In a further embodiment, X is OH.

In one embodiment, in Formula 1, n is from 1-5. In a further embodiment, n is from 1 to 2. In a further embodiment, n is 2.

In one embodiment, in Formula 1, m is from 15-20. In a further embodiment, m is 18.

In one embodiment, Formula 1 is octadecyl-3-(3,5-di-tert-butyl-4-hydroxyphenyl)-propionate (CAS 002082-79-3), available as IRGANOX 1076.

A structure of Formula 1 may comprise a combination of two or more of the above embodiments.

Formula 2 is shown below:

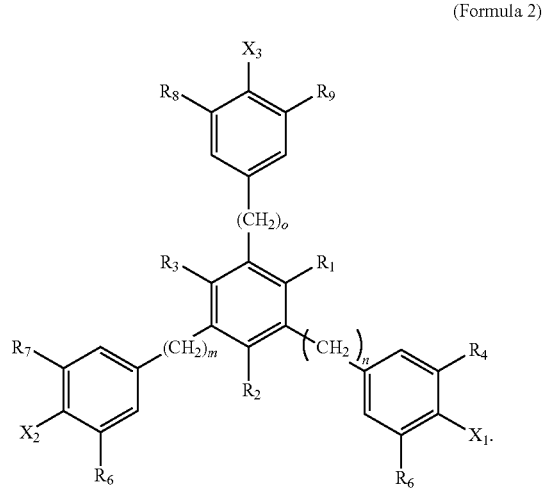

(Formula 2)

In Formula 2, R1, R2 and R3 are each independently selected from a C1-C20 alkyl group;

R4, R5, R6, R7, R8 and R9 are each independently selected from a C1-C20 alkyl group;

X1, X2 and X3 are each independently selected from Cl, Br, I, F, OH, $NH_2$, NHR' or NR'R", where R' and R" are each independently a C1-C6 alkyl;

n is from 1 to 6;

m is from 1 to 6; and o is from 1 to 6.

Examples of C1-C20 alkyls include, but are not limited to, methyl, ethyl, n-propyl, iso-propyl, n-butyl, sec-butyl, iso-butyl, tert-butyl, n-pentyl, neopentyl, n-hexyl, and cyclohexyl.

In one embodiment, in Formula 2, R1, R2 and R3 are each independently a C1-C10 alkyl, a C1-C5 alkyl, a C1-C4 alkyl, a C1-C3 alkyl, or a C1-C2 alkyl. In a further embodiment, R1, R2 and R3 are each independently a C1 alkyl.

In one embodiment, in Formula 2, R1, R2 and R3 are each independently selected from methyl or ethyl. In a further embodiment, R1, R2 and R3 are each methyl.

In one embodiment, in Formula 2, R1, R2 and R3 are the same alkyl substituent.

In one embodiment, in Formula 2, R4, R5, R6, R7, R8 and R9 are each independently selected from a C1-C10 alkyl, a C1-C6 alkyl, a C1-C4 alkyl, a C2-C4 alkyl, or a C3-C4 alkyl.

In a further embodiment, R4, R5, R6, R7, R8 and R9 are each independently a C4 alkyl.

In one embodiment, in Formula 2, R4, R5, R6, R7, R8 and R9 are each independently selected from n-butyl, sec-butyl, iso-butyl, tert-butyl. In a further embodiment, R4, R5, R6, R7, R8 and R9 are each tert-butyl.

In one embodiment, in Formula 2, R4, R5, R6, R7, R8 and R9 are the same alkyl substituent.

In one embodiment, in Formula 2, X1, X2 and X3 are each independently selected from Cl, Br or OH. In a further embodiment, X1, X2 and X3 are each independently selected from Cl or OH. In a further embodiment, X1, X2 and X3 are each OH.

In one embodiment, in Formula 2, X1, X2 and X3 are the same substituent.

In one embodiment, in Formula 2, n is from 1-4. In a further embodiment, n is from 1 to 2. In a further embodiment, n is 1.

In one embodiment, in Formula 2, m is from 1-4. In a further embodiment, m is from 1 to 2. In a further embodiment, m is 1.

In one embodiment, in Formula 2, o is from 1-4. In a further embodiment, o is from 1 to 2. In a further embodiment, o is 1.

In one embodiment, in Formula 2, m=n=0.

In one embodiment, Formula 2 is 1,3,5-trimethyl-2,4,6-tris(3,5-di-t-butyl-4-hydroxybenzyl)benzene (IRGANOX 1330).

A structure of Formula 2 may comprise a combination of two or more of the above embodiments.

Formula 3 is shown below:

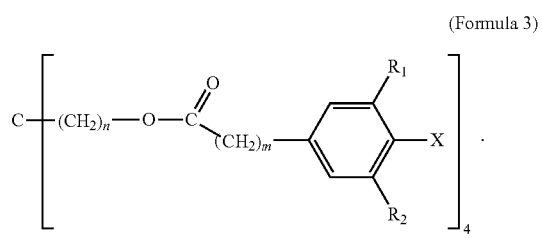

(Formula 3)

In Formula 3, R1 and R2 are each independently selected from a C1-C20 alkyl group;

X is selected from Cl, Br, I, F, OH, NH$_2$, NHR' or NR'R", where R' and R" are each independently a C1-C6 alkyl;

n is from 1 to 10; and m is from 1 to 10.

Examples of C1-C20 alkyls include, but are not limited to, methyl, ethyl, n-propyl, iso-propyl, n-butyl, sec-butyl, iso-butyl, tert-butyl, n-pentyl, neopentyl, n-hexyl, and cyclohexyl.

In one embodiment, in Formula 3, R1 and R2 are each independently a C1-C10 alkyl, a C1-C6 alkyl, a C1-C4 alkyl, a C2-C4 alkyl, or a C3-C4 alkyl. In a further embodiment, R1 and R2 are each independently a C4 alkyl.

In one embodiment, in Formula 3, R1 and R2 are each independently selected from n-butyl, sec-butyl, iso-butyl, tert-butyl. In a further embodiment, R1 and R2 are each tert-butyl.

In one embodiment, in Formula 3, R1 and R2 are the same alkyl substituent.

In one embodiment, in Formula 3, X is selected from Cl, Br or OH. In a further embodiment, X is selected from Cl or OH. In a further embodiment, X is OH.

In one embodiment, in Formula 3, n is from 1 to 6. In a further embodiment, n is from 1 to 4. In a further embodiment, n is from 1 to 2. In a further embodiment, n is 1.

In one embodiment, in Formula 3, m is from 1 to 6. In a further embodiment, m is from 1 to 4. In a further embodiment, m is from 1 to 2. In a further embodiment, m is 2.

In one embodiment, Formula 3 is IRGANOX 1010 (Pentaerythritol Tetrakis(3-(3,5-di-tert-butyl-4-hydroxyphenyl) propionate) (CAS 6683-19-8)).

A structure of Formula 3 may comprise a combination of two or more of the above embodiments.

Formula 4 is shown below:

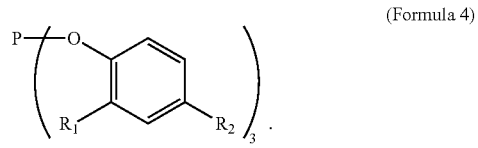

(Formula 4)

In Formula 4, R1 and R2 are each independently selected from a C1-C20 alkyl group.

Examples of C1-C20 alkyls include, but are not limited to, methyl, ethyl, n-propyl, iso-propyl, n-butyl, sec-butyl, iso-butyl, tert-butyl, n-pentyl, neopentyl, n-hexyl, and cyclohexyl.

In one embodiment, in Formula 4, R1 and R2 are each independently a C1-C10 alkyl, a C1-C6 alkyl, a C1-C4 alkyl, a C2-C4 alkyl, or a C3-C4 alkyl. In a further embodiment, R1 and R2 are each independently a C4 alkyl.

In one embodiment, in Formula 4, R1 and R2 are each independently selected from n-butyl, sec-butyl, iso-butyl, tert-butyl. In a further embodiment, R1 and R2 are each tert-butyl.

In one embodiment, in Formula 4, R1 and R2 are the same alkyl substituent.

In one embodiment, Formula 4 is tris-(2,4-di-tert-butylphenyl)phosphate (CAS 31570-04-4) available as IRGAFOS 168.

A structure of Formula 4 may comprise a combination of two or more of the above embodiments.

Formula 5 is shown below:

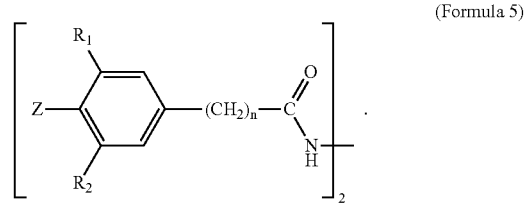

(Formula 5)

In Formula 5, R1 and R2 are each independently selected from a C1-C20 alkyl group;

Z is selected from Cl, Br, I, F, OH, NH$_2$, NHR' or NR'R", where R' and R" are each independently a C1-C6 alkyl; and n is from 1 to 10.

Examples of C1-C20 alkyls include, but are not limited to, methyl, ethyl, n-propyl, iso-propyl, n-butyl, sec-butyl, iso-butyl, tert-butyl, n-pentyl, neopentyl, n-hexyl, and cyclohexyl.

In one embodiment, in Formula 5, R1 and R2 are each independently a C1-C10 alkyl, a C1-C6 alkyl, a C1-C4 alkyl, a C2-C4 alkyl, or a C3-C4 alkyl. In a further embodiment, R1 and R2 are each independently a C4 alkyl.

In one embodiment, in Formula 5, R1 and R2 are each independently selected from n-butyl, sec-butyl, iso-butyl, tert-butyl. In a further embodiment, R1 and R2 are each tert-butyl.

In one embodiment, in Formula 5, R1 and R2 are the same alkyl substituent.

In one embodiment, in Formula 5, Z is selected from Cl, Br or OH. In a further embodiment, Z is selected from Cl or OH. In a further embodiment, Z is OH.

In one embodiment, in Formula 5, n is from 1 to 5. In a further embodiment, n is from 1 to 2. In a further embodiment, n is 2.

In one embodiment, Formula 5 is IRGANOX MD-1024 (2',3-bis[[3-[3,5-di-tert-butyl-4-hydroxyphenyl]propionyl]] propionohydrazide. (CAS 32687-78-8)).

A structure of Formula 5 may comprise a combination of two or more of the above embodiments.

Additional antioxidants include 1,3,5-tris(3,5-di-tert-butyl-4-hydroxybenzyl)-1,3,5-triazine-2,4,6(1H,3H,5H)-trione (CAS 2767-62-6) available as IRGANOX 3114; 1,3,5-tris(4-tert-butyl-3-hydroxy-2,6-dimethyl benzyl)-1,3,5-triazine-2,4,6-(1H,3H,5H)-trione (CAS 040601-76) available as CYANOX 1790 (CyTech Industries); Ethylenebis(oxyethylene)bis-(3-(5-tert-butyl-4-hydroxy-m-tolyl)-propionate) (CAS 36443-68-2) available as IRGANOX 245; 1,6-Hexamethylene bis (3,5-di(tert)-butyl-4-hydroxyhydrocinnamate (CAS 35074-77-2) available as IRGANOX 259; Thiodiethylene bis[3-(3,5-di-tert-butyl-4-hydroxyphenyl) propionate] (CAS 41484-35-9) available as IRGANOX 1035; DOVERFOS 9228; 2,2'-oxalyldiamidobis [ethyl 3-(3,5-di-t-butyl-4-hydroxyphenyl) propionate] (available as NAUGARD XL1); and mixtures thereof.

Processing aids, UV stabilizers, other antioxidants, pigments or colorants, can also be advantageously used with the compositions of the present invention.

Definitions

Unless stated to the contrary, implicit from the context, or customary in the art, all parts and percents are based on weight, and all test methods are current as of the filing date of this application.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities may be incorporated into the polymer and/or within the bulk polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene/α-olefin interpolymer," as used herein, refers to an interpolymer that comprises, in polymerized form, a majority amount of ethylene monomer (based on the weight of the interpolymer), and at least one α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term, "propylene-based polymer," as used herein, refers to a polymer that comprises, in polymerized form, a majority amount of propylene monomer (based on the weight of the polymer), and optionally may comprise one or more comonomers.

The term "melt processing," as used herein, refers to any process in which the polymer is softened or melted, such as extrusion, pelletizing, film blowing and casting, thermoforming, compounding in polymer melt form, and the like.

The terms "blend" or "polymer blend," as used herein, refer to a mixture of two or more polymers. Such a blend may or may not be miscible. Such a blend may or may not be phase separated. Such a blend may or may not contain one or more domain configurations, as determined from transmission electron microscopy, light scattering, x-ray scattering, and other methods known in the art.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Resin density was measured by the Archimedes displacement method, ASTM D 792, Method B, in isopropanol. Specimens were measured within one hour of molding, after conditioning in the isopropanol bath, at 23° C., for eight minutes to achieve thermal equilibrium prior to measurement. The specimens were compression molded according to ASTM D-4703-00, Annex A, with a five minutes initial heating period at about 190° C., and a 15° C./min cooling rate per Procedure C. Each specimen was cooled to 45° C. in the press, with continued cooling until "cool to the touch."

Melt index measurements were performed according to ASTM D-1238, Condition 190° C./2.16 kg and Condition 190° C./21.6 kg, which are known as $I_2$ and $I_{21}$, respectively.

Gel Permeation Chromatography

The chromatographic system consisted of either a Polymer Laboratories Model PL-210 or a Polymer Laboratories Model PL-220. The column and carousel compartments were operated at 140° C. The columns used were three Polymer Laboratories, 10-micron Mixed-B columns. The solvent was 1,2,4 trichlorobenzene. The samples were prepared at a concentration of "0.1 gram of polymer in 50 milliliters of solvent." The solvent used to prepare the samples contained "200 ppm of butylated hydroxytoluene (BHT)." Samples were prepared by agitating lightly for two hours at 160° C. The injection volume was 100 microliters, and the flow rate was 1.0 milliliters/minute.

Calibration of the GPC column set was performed with 21 narrow molecular weight distribution polystyrene standards, with molecular weights ranging from 580 to 8,400,000, arranged in six "cocktail" mixtures, with at least a decade of separation between individual molecular weights. The standards were purchased from Polymer Laboratories (Shropshire, UK). The polystyrene standards were prepared at "0.025 grams in 50 milliliters of solvent" for molecular weights equal to, or greater than, 1,000 kg/mol, and "0.05 grams in 50 milliliters of solvent" for molecular weights less than 1,000 kg/mol. The polystyrene standards were dissolved at 80 degrees Celsius, with gentle agitation, for 30 minutes. The narrow standards mixtures were run first, and in order of decreasing "highest molecular weight component" to minimize degradation. The polystyrene standard peak molecular weights were converted to polyethylene molecular weights using the following equation, $M_{polyethylene}=A \times (M_{polystyrene})^B$, where M is the molecular weight, A has a value of 0.431 and B is equal to 1.0. Polyetheylene equivalent molecular weight calculations were performed using VISCOTEK TriSEC software Version 3.0.

The invention is further illustrated by the following Examples, which, however, shall not be construed as a limitation of the invention.

EXPERIMENTAL

Composition 1: ethylene-based polymer (I2=0.08 g/10 min, I21=6-8 g/10 min, density=0.950 g/cc) plus 1160 ppm IRGAFOS 168, 2200 ppm IRGANOX 1330, 1760 ppm IRGANOX 1010, 1000 ppm IRGANOX 1076, and 1000 ppm IRGANOX 1024 MD.

The above compositions were each prepared by melt mixing the additives (in each ppm amount specified above) and the ethylene-based polymer, and pelletizing the final composition. Each composition was extruded into a tube (half-inch IPS pipe).
Slow crack growth (SCG) resistance (ASTM F-1473)-PENT value
  Composition 1: PENT greater than 10,000 hours.
  Commercial PP (propylene-based polymer): PENT less than 1 hour.
Extrusion Example
Tube was extruded on an AMERICAN MAPLAN (60 mm barrel, 30/1 L/D) extrusion line, equipped with a pipe die for the manufacture of nominally ½ inch IPS (iron pipe size), SDR 11 pipe. The resin (Composition 1, with a final density from 0.947-0.951 g/cc (1 cc=1 cm³), and final I21 from 6-8 g/10 min) was blended with a carbon black masterbatch, using a INOEX feeder/blender system, before the pipe extrusion. The carbon black masterbatch contained "35 weight percent of carbon black" in a LLDPE carrier resin. The black masterbatch (6.5 wt %) was added to the Composition 1, which resulted in 2.25 wt % carbon black in the final tubing.

The extruder temperature profile and process conditions are given in the example below. A vacuum sizing method was employed to dimensionally size the tube. An additional cooling water tank was employed to completely solidify the tube. The cooling water temperature was approximately 55-60° F. A variable speed puller was run under constant speed conditions, for the tube size produced.
  Typical extrusion conditions are as follows.
  Barrel Temperature: 400° F.
  Die Temperature: 410° F.
  Melt Temperature: 405° F.
  Amp Load: 55%
  Head Pressure: 1580 psi
  Output Rate: 225 lbs/hr
  Tube O.D.: ½ inch IPS.
According to ASTM D2513, ½" IPS has an OD of 0.842" with a wall of 0.076".
  Size: SDR 11
Panel Five hollow tubes were arranged in approximately a parallel orientation, on a sheet of cardboard. Each tube was "47 inches" in length and "0.682 inches (17.3 mm)" in I.D. (internal diameter). The OD (outer diameter) for each tube was "0.842 inch (21.3 mm)" Each tube was connected to an inlet tube, and an outlet tube at its opposite end. Both inlet and outlet tubes have the following dimensions: OD=0.842 inch, length=14 inches.

Figure 5:
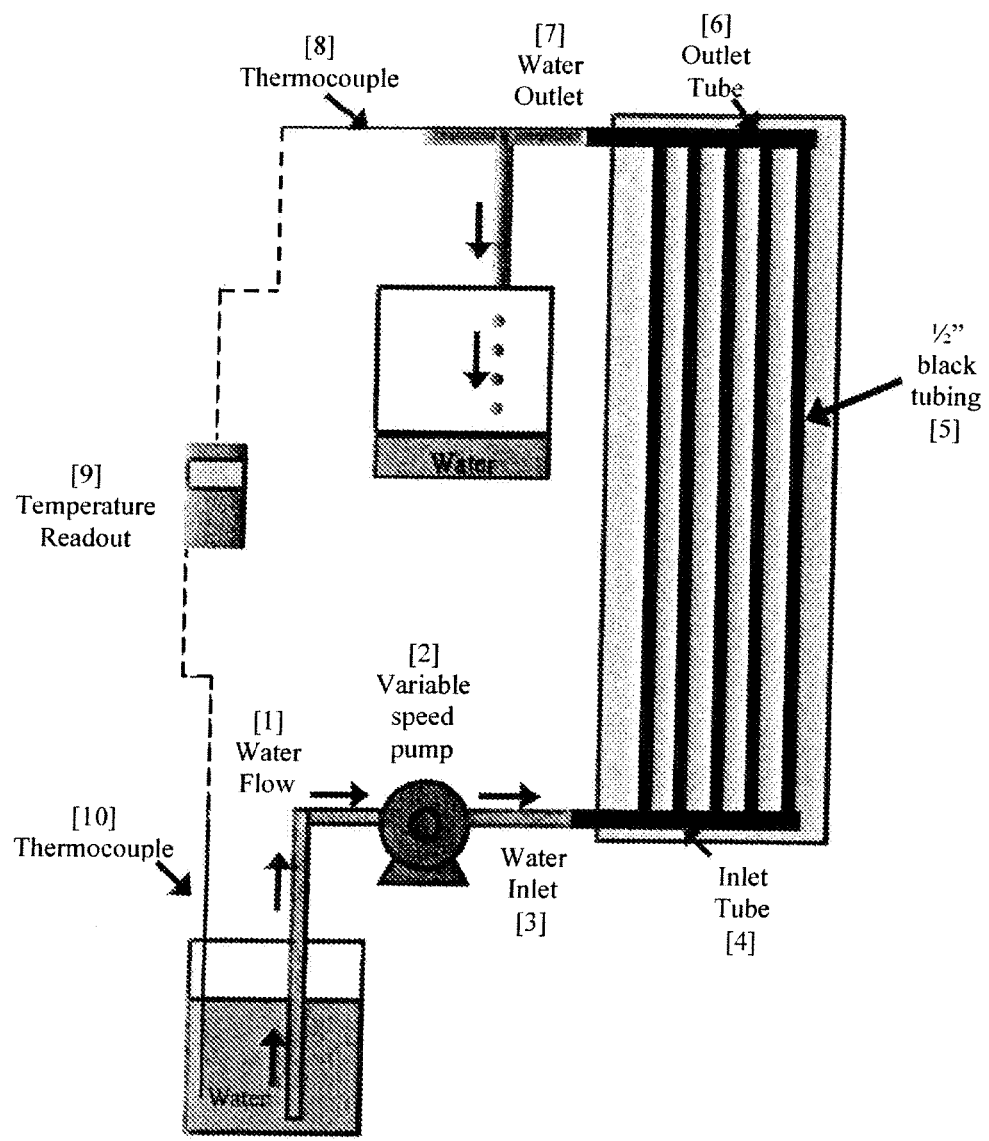
FIG. 5 is a schematic of a panel, containing five hollow tubes, inlet tube and outlet tube, used in a solar panel set-up. See Experimental Section-Panel.

The panel configuration is schematically shown in FIG. 5. This panel was examined for use as a solar panel, by measuring the temperature of water when entering the panel, and when exiting the panel. A variable speed pump was used to pump water into the inlet tube. Water flowed through each hollow tube, and into the outlet tube, and was collected into a container. Two thermocouples were located in the water reservoir and the panel outlet, respectively, as shown in FIG. 5. The water temperature of the water in the reservoir (inlet temperature) and the temperature of the water in the outlet of the panel (outlet temperature) were measured, and the results are shown in Table 1 below. Each temperature was taken at the time of day specified in Table 1. An INFRARED thermometer was used to measure the external temperature of the black panel under the sun (Black Tube Ext. Temp.; the temperatures at 3 to 5 locations on the panel were measured, and average reported). As seen in Table 1 that inventive panel is an effective solar panel, able to heat the water flowing through the panel.

TABLE 1

| Date | Time of Day | Ambient Temp (° F.) | Black Tube Ext. Temp (before water flow) (° F.) | Water How Rate (ml/min) | Water Inlet Temp (° F.) | Water Outlet Temp (° F.) | ΔT (° F.) |
| --- | --- | --- | --- | --- | --- | --- | --- |
| May 25, 2012 Sunny (Partly Cloudy) | 3:35 PM | 88.7 (31.5° C.) | 118 (47.8° C.) | 102 | 77.6 (25.3° C.) | 94.1 (34.5° C.) | 16.5 (9.2° C.) |
| | 4:09 PM | 89.2 (31.8° C.) | 118 (47.8° C.) | 195 | 77.6 (25.3° C.) | 91.9 (33.3° C.) | 14.3 (8.0° C.) |
| | 4:41 PM | 89.3 (31.8° C.) | 118 (47.8° C.) | 310 | 77.6 (25.3° C.) | 87.8 (31.0° C.) | 10.2 (5.7° C.) |
| | 5:17 PM | 89.4 (31.9° C.) | 118 (47.8° C.) | 420 | 77.6 (25.3° C.) | 86.0 (30.0° C.) | 8.4 (4.7° C.) |
| | 5:44 PM | 89.4 (31.9° C.) | 118 (47.8° C.) | 515 | 77.6 (25.3° C.) | 85.1 (29.5° C.) | 7.5 (4.2° C.) |

The invention claimed is:

1. A solar panel comprising at least the following components:
   a) at least one hollow container;
   b) an inlet;
   c) an outlet; and
   wherein the inlet is connected to the end of the at least one hollow container; and the outlet is connected to an opposite end of the at least one hollow container;

and wherein the at least one hollow container comprises at least one component formed from a composition comprising the following components:

A) an ethylene-based polymer;
B) a compound selected from Formula 1:

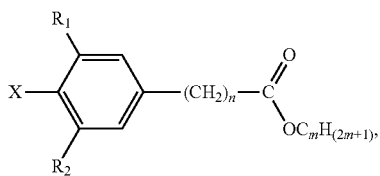
(Formula 1)

wherein R1 and R2 are each independently selected from a C1-C20 alkyl group,

X is selected from Cl, Br, I, F, OH, $NH_2$, NHR' or NR'R", where R' and R" are each independently a C1-C6 alkyl, n is from 1 to 10, and m is from 10 to 30, and wherein this compound is present in an amount greater than, or equal to, 500 ppm, based on the total weight of the composition;

C) a compound selected from Formula 2:

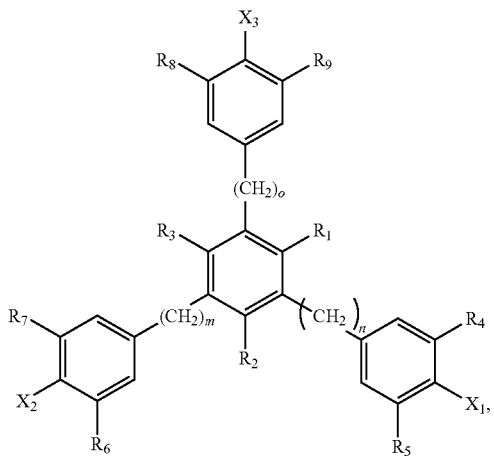
(Formula 2)

wherein R1, R2 and R3 are each independently selected from a C1-C20 alkyl group;

R4, R5, R6, R7, R8 and R9 are each independently selected from a C1-C20 alkyl group, X1, X2 and X3 are each independently selected from Cl, Br, I, F, OH, $NH_2$, NHR' or NR'R", where R' and R" are each independently a C1-C6 alkyl, n is from 1 to 6, m is from 1 to 6, and o is from 1 to 6;

and wherein the weight ratio of Component C to Component B (C/B) is from 1 to 6;

D) a component D selected from Formula 3:

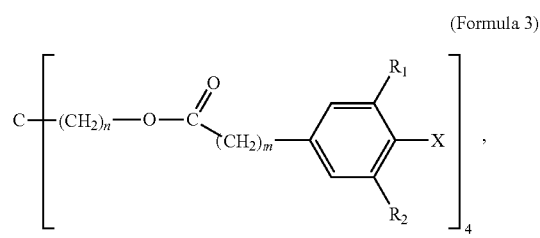
(Formula 3)

wherein R1 and R2 are each independently selected from a C1-C20 alkyl group,

X is selected from Cl, Br, I, F, OH, $NH_2$, NHR' or NR'R", where R' and R" are each independently a C1-C6 alkyl, n is from 1 to 10, and m is from 1 to 10, and wherein the weight ratio of Component D to Component B (D/B) is from 1 to 2;

E) a component E, selected from Formula 4:

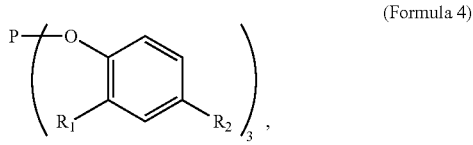
(Formula 4)

wherein R1 and R2 are each independently selected from a C1-C20 alkyl group, and wherein the weight ratio of Component E to Component B (E/B) is from 0.8 to 1.5.

2. The panel of claim 1, wherein the at least one hollow container has a wall thickness less than, or equal to, 1 mm.

3. The panel of claim 1, wherein the at least one hollow container has a wall thickness greater than, or equal to, 0.05 mm.

4. The panel of claim 1, wherein the at least one hollow container has an inner diameter greater than, or equal to, 0.25 inch.

5. The panel of claim 1, wherein the panel comprises at least two hollow containers.

6. The panel of claim 5, wherein the at least two hollow containers are arranged in a parallel configuration.

7. The panel of claim 1, wherein the composition comprises greater than, or equal to, 50 weight percent of the ethylene-based polymer, based on the weight of the composition.

8. The panel of claim 1, wherein, for the composition, the weight ratio of C/B is from 1 to 2.2.

9. The panel of claim 1, wherein for the composition, Component B is present in an amount from 1000 to 2500 ppm, based on the weight of the composition.

10. The panel of claim 1, wherein for the composition, Component C is present in an amount from 1000 to 3000 ppm, based on the weight of the composition.

11. The panel of claim 1, wherein for the composition further comprises a Component F selected from Formula 5:

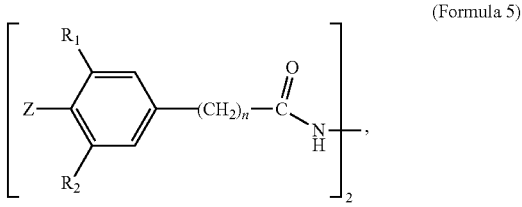
(Formula 5)

wherein R1 and R2 are each independently selected from a C1-C20 alkyl group; Z is selected from Cl, Br, I, F, OH, $NH_2$, NHR' or NR'R", where R' and R" are each independently a C1-C6 alkyl; and n is from 1 to 10.

12. A solar panel of claim 1 consisting of the following components:
   a) at least two hollow containers, each in the form of a vertical tube;
   b) an inlet;
   c) an outlet; and
   wherein the inlet is connected to the end of the at least two hollow containers by heat fusion, insertion fitting, or a combination thereof; and
   the outlet is connected to an opposite end of the at least two hollow containers by heat fusion, insertion fitting, or a combination thereof.

13. The panel of claim 12, wherein the major axis of inlet is oriented perpendicular to the major axis of the at least one hollow container.

14. The panel of claim 13, wherein the inlet is a tube.

15. The panel of claim 12, wherein the major axis of inlet is oriented perpendicular to the major axis of the at least one hollow container.

16. The panel of claim 15, wherein the outlet is a tube.

* * * * *